(12) United States Patent
Matsumoto (10) Patent No.: US 8,607,649 B2
(45) Date of Patent: Dec. 17, 2013

(54) TORQUE SENSOR

(75) Inventor: Kenjirou Matsumoto, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 235 days.

(21) Appl. No.: 12/715,851

(22) Filed: Mar. 2, 2010

(65) Prior Publication Data

US 2010/0257947 A1    Oct. 14, 2010

(30) Foreign Application Priority Data

Apr. 8, 2009    (JP) .................................. 2009-094253

(51) Int. Cl.
*G01L 3/00* (2006.01)

(52) U.S. Cl.
USPC ..................................................... 73/862.333

(58) Field of Classification Search
USPC .................. 73/862.331–862.338, 862.625
See application file for complete search history.

(56) References Cited

U.S. PATENT DOCUMENTS

| | | | | |
|---|---|---|---|---|
| 7,124,495 B2 * | 10/2006 | Gieras et al. | ..................... | 29/596 |
| 7,170,410 B2 * | 1/2007 | Matsumoto et al. | ....... | 340/568.1 |
| 7,293,472 B2 * | 11/2007 | Tokumoto et al. | ........ | 73/862.331 |
| 7,415,898 B2 * | 8/2008 | Ishihara et al. | .......... | 73/862.331 |
| 7,562,590 B2 * | 7/2009 | Tokumoto et al. | ........ | 73/862.331 |
| 7,568,400 B2 * | 8/2009 | Tokumoto et al. | ........ | 73/862.333 |
| 7,845,244 B2 * | 12/2010 | Aoki et al. | ................ | 73/862.335 |
| 7,987,734 B2 * | 8/2011 | Maehara | .................. | 73/862.333 |
| 8,418,570 B2 * | 4/2013 | Maehara | .................. | 73/862.325 |
| 2009/0001843 A1 * | 1/2009 | Enomoto et al. | .............. | 310/257 |

FOREIGN PATENT DOCUMENTS

JP    2008-180517 A    8/2008

* cited by examiner

*Primary Examiner* — Harshad R Patel
*Assistant Examiner* — Octavia Davis-Hollington
(74) *Attorney, Agent, or Firm* — Arent Fox LLP (57) ABSTRACT

A torque sensor is configured so that a multi-pole permanent magnet is fixed to one of a first shaft and a second shaft linked via a torsion bar, a first rotating yoke and a second rotating yoke each having provided at equal intervals in the peripheral direction a plurality of claw portions facing the permanent magnet are fixed to the other of the first shaft and second shaft, and a magnetism detection element is disposed between a first magnetism-collecting yoke and a second magnetism-collecting yoke individually facing the first and second rotating yokes. The first and second rotating yokes are formed into identical shapes, and the claw portions provided respectively on the rotating yokes are alternatingly disposed in the peripheral direction within the same plane perpendicular to the axes of the first shaft and second shaft. Accordingly, it is possible to reduce a cost by having fewer types of parts.

2 Claims, 10 Drawing Sheets

TORQUE SENSOR

BACKGROUND OF THE INVENTION

1. Field of the Invention

The present invention relates to a torque sensor in which a multi-pole permanent magnet having a plurality of N poles and a plurality of S poles alternatingly arranged in the peripheral direction is fixed to one of a first shaft and a second shaft linked via a torsion bar, a first rotating yoke and a second rotating yoke each having provided at equal intervals in the peripheral direction a plurality of claw portions facing the permanent magnet are fixed to the other of the first shaft and the second shaft, and a magnetism detection element is disposed between a first magnetism-collecting yoke and a second magnetism-collecting yoke individually facing the first and second rotating yokes and, in particular, to an improvement of a torque sensor suitably used in an electric power steering system.

2. Description of the Related Art

A torque sensor in which a ring-shaped multi-pole magnet is fixed to a first shaft side linked to a second shaft via a torsion bar, and a pair of rotating yokes each having a claw portion facing the multi-pole magnet are fixed to the second shaft side, is known from Japanese Patent Application Laid-open No. 2008-180517.

However, in the arrangement disclosed by Japanese Patent Application Laid-open No. 2008-180517, since the pair of rotating yokes have different shapes from each other, it is necessary to produce two types of rotating yokes and, moreover, it is also necessary to produce two types of magnetism-collecting yokes, thereby resulting in an increase in production cost.

SUMMARY OF THE INVENTION

The present invention has been accomplished in light of such circumstances, and it is an object thereof to provide a torque sensor that enables a reduction in cost by having fewer types of parts.

In order to achieve the object, according to a first feature of the present invention, there is provided a torque sensor in which a multi-pole permanent magnet is fixed to one of a first shaft and a second shaft linked via a torsion bar, a first rotating yoke and a second rotating yoke each having provided at equal intervals in a peripheral direction a plurality of claw portions facing the permanent magnet are fixed to the other of the first shaft and the second shaft, and a magnetism detection element is disposed between a first magnetism-collecting yoke and a second magnetism-collecting yoke individually facing the first and second rotating yokes, wherein the first and second rotating yokes are formed into identical shapes, and the claw portions provided respectively on the rotating yokes are alternatingly disposed in the peripheral direction within the same plane perpendicular to axes of the first shaft and the second shaft.

In accordance with the first feature of the present invention, when twisting occurs between the first shaft and the second shaft, the relative position in the peripheral direction between the permanent magnet and the claw portions of the first and second rotating yokes changes to thus cause a change in magnetic flux between the first and second magnetism-collecting yokes, thereby allowing the twisting between the first shaft and the second shaft to be detected. Moreover, the first and second rotating yokes are formed into identical shapes, and the first and second magnetism-collecting yokes individually facing these rotating yokes can also be formed into identical shapes, and it is therefore possible to lessen the number of parts, thereby reducing the cost.

According to a second feature of the present invention, in addition to the first feature, the first and second magnetism-collecting yokes are disposed so as to individually face the first and second rotating yokes from a direction along the axial direction of the first and second shafts.

In accordance with the second feature of the present invention, the first and second magnetism-collecting yokes are disposed so as to be spaced in the axial direction of the first shaft and the second shaft; it is therefore possible to reduce the dimension of the torque sensor in its radial direction.

The above description, other objects, characteristics and advantages of the present invention will be clear from detailed descriptions which will be provided for the preferred embodiments referring to the attached drawings.

DESCRIPTION OF THE PREFERRED EMBODIMENTS

Embodiments of the present invention will be described below with reference to the attached drawings.

Embodiment 1

Embodiment 1 of the present invention is explained by reference to FIG. 1 to FIG. 7. First, in FIG. 1, with regard to an electric power steering system, a torque sensor 14A arranged in accordance with the present invention so as to detect twisting between a first shaft 11 and a second shaft 12 linked via a torsion bar 13 is disposed on a middle part of a steering shaft. The torque sensor 14A includes a ring-shaped permanent magnet 15 fixed to one of the coaxial first shaft 11 and second shaft 12, that is, the first shaft 11, first and second rotating yokes 16 and 17 fixed to the other of the first shaft 11 and the second shaft 12, that is, the second shaft 12, first and second magnetism-collecting yokes 18 and 19 individually facing the first and second rotating yokes 16 and 17, and a magnetism detection element 20 disposed between the first and second magnetism-collecting yokes 18 and 19.

Figure 1:
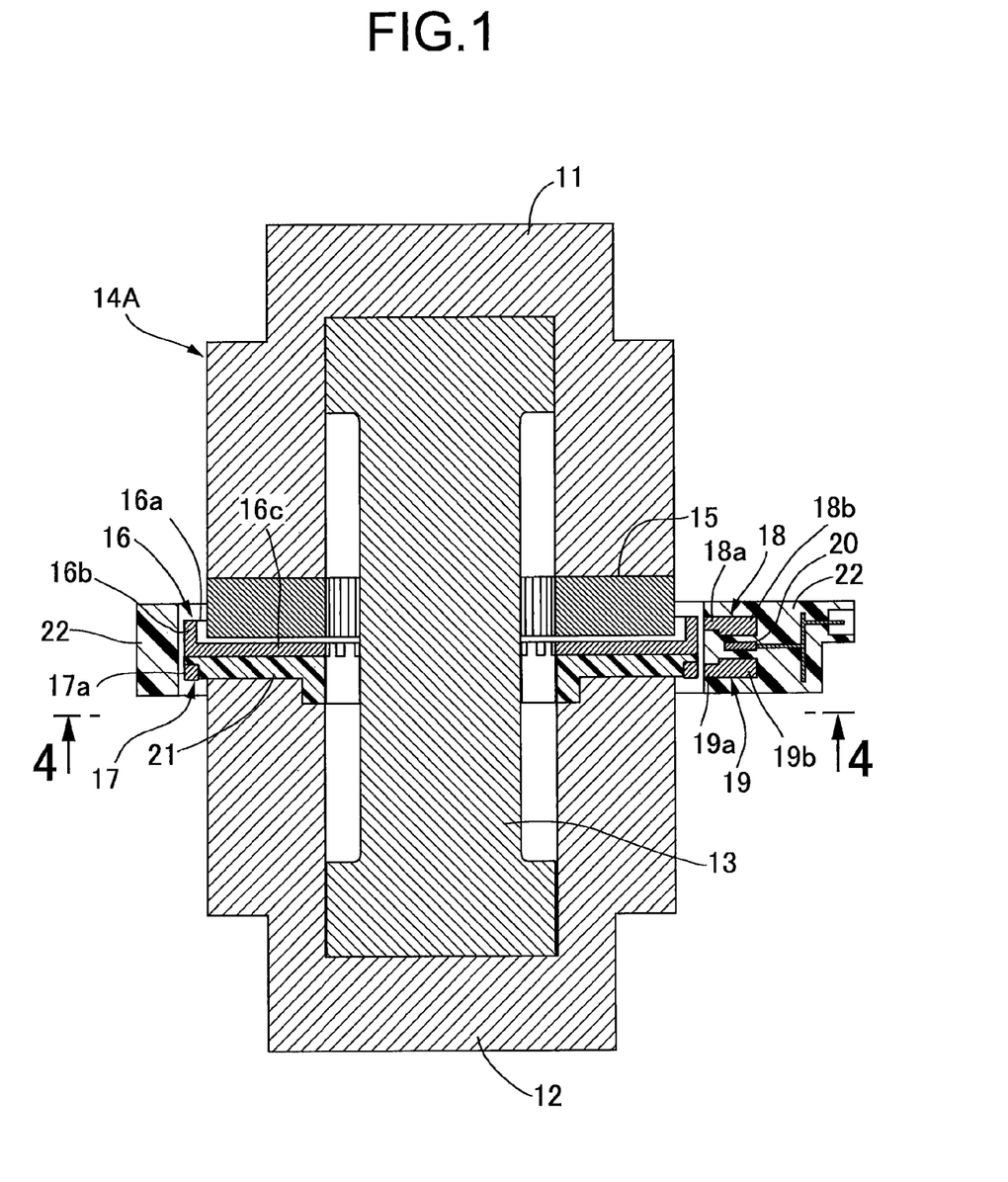
FIG. 1 is a longitudinal cross-sectional view of a torque sensor according to Embodiment 1.
Figure 2:
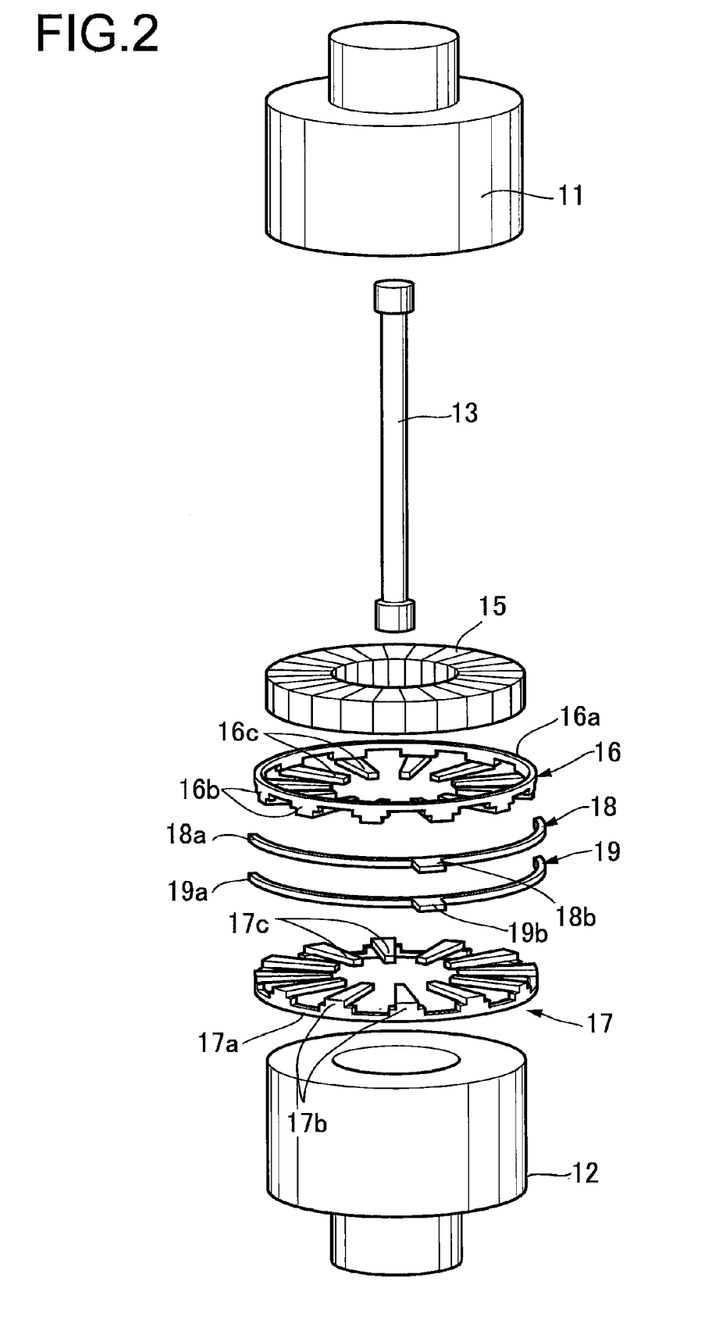
FIG. 2 is an exploded perspective view of the torque sensor with a holder being omitted.
Figure 3:
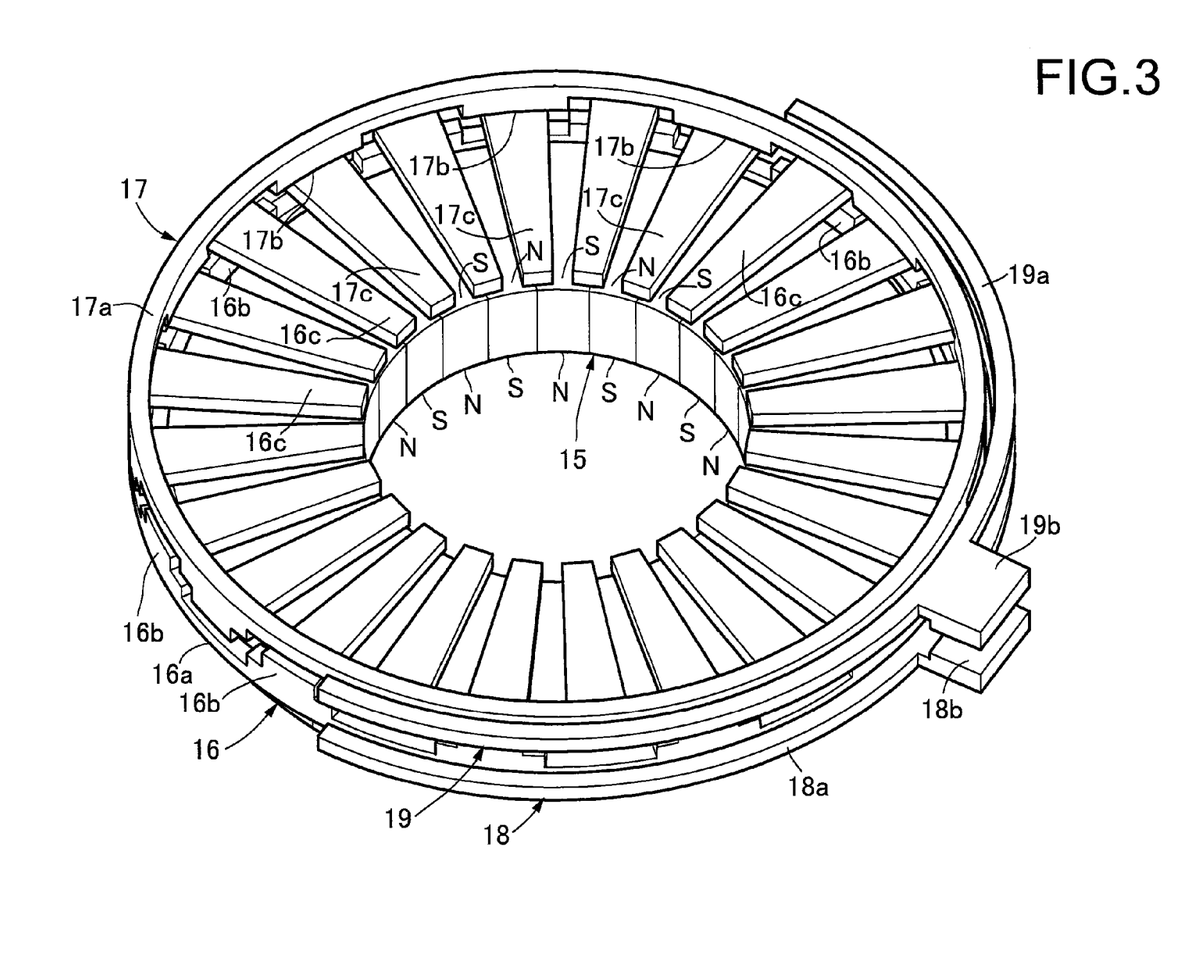
FIG. 3 is a perspective view showing rotating yokes, magnetism-collecting yokes, and a permanent magnet seen from a second shaft side.

Referring to FIG. 2 and FIG. 3 together, the permanent magnet 15 is formed into a ring shape as a multi-pole permanent magnet divided into a plurality of portions at equal intervals in the peripheral direction, and is fixedly provided on an end part, on the second shaft 12 side, of the first shaft 11, and a plurality, for example 12, of N poles and a plurality, for example 12, of S poles disposed between the N poles are arranged at one end part and the other end part in the axial direction of the permanent magnet 15 so as to be adjacent to each other in the peripheral direction.

Furthermore, a rotating holder 21 made of a synthetic resin into a cylindrical shape is fixedly provided on an end part, on the first shaft 11 side, of the second shaft 12 so as to face one end face in the axial direction of the permanent magnet 15, and part of the permanent magnet 15 and the rotating holder 21 are surrounded by a fixed holder 22 formed from a synthetic resin into a cylindrical shape and disposed at a fixed position.

The first and second rotating yokes 16 and 17 are formed into identical shapes having ring portions 16a and 17a, projections 16b; 17b projecting in one axial direction from a plurality, for example 12, of positions spaced at equal intervals in the peripheral direction of the ring portions 16a and 17a, and claw portions 16c; 17c extending inward in the radial direction of the ring portions 16a and 17a from the extremities of the projections 16b; 17b.

The first and second rotating yokes 16 and 17 are disposed so as to face each other so that the projections 17b of the second rotating yoke 17 on the second shaft 12 side are disposed between the projections 16b of the first rotating yoke 16 on the first shaft 11 side, and are mold bonded to the rotating holder 21 so as to be spaced in the axial direction of the first shaft 11 and the second shaft 12 so that the claw portions 16c; 17c are alternatingly disposed in the peripheral direction within the same plane perpendicular to the axes of the first shaft 11 and the second shaft 12. Moreover, the outer peripheries of the ring portions 16a and 17a of the two rotating yokes 16 and 17 are flush with the outer periphery of the rotating holder 21.

The first and second magnetism-collecting yokes 18 and 19 are formed into identical shapes integrally having arc portions 18a and 19a formed into an arc shape with the axis of the second shaft 12 as the center and magnetism-collecting portions 18b and 19b projecting outward in the radial direction from a central part in the peripheral direction of the arc portions 18a and 19a, and mold bonded to the fixed holder 22 at positions spaced in the axial direction of the first shaft 11 and the second shaft 12 so that the inner periphery of the arc portion 18a faces the outer periphery of the first rotating yoke 16 and the inner periphery of the arc portion 19a faces the outer periphery of the second rotating yoke 17, and the magnetism detection element 20 disposed between the magnetism-collecting portions 18b and 19b is embedded in the fixed holder 22.

Figure 4:
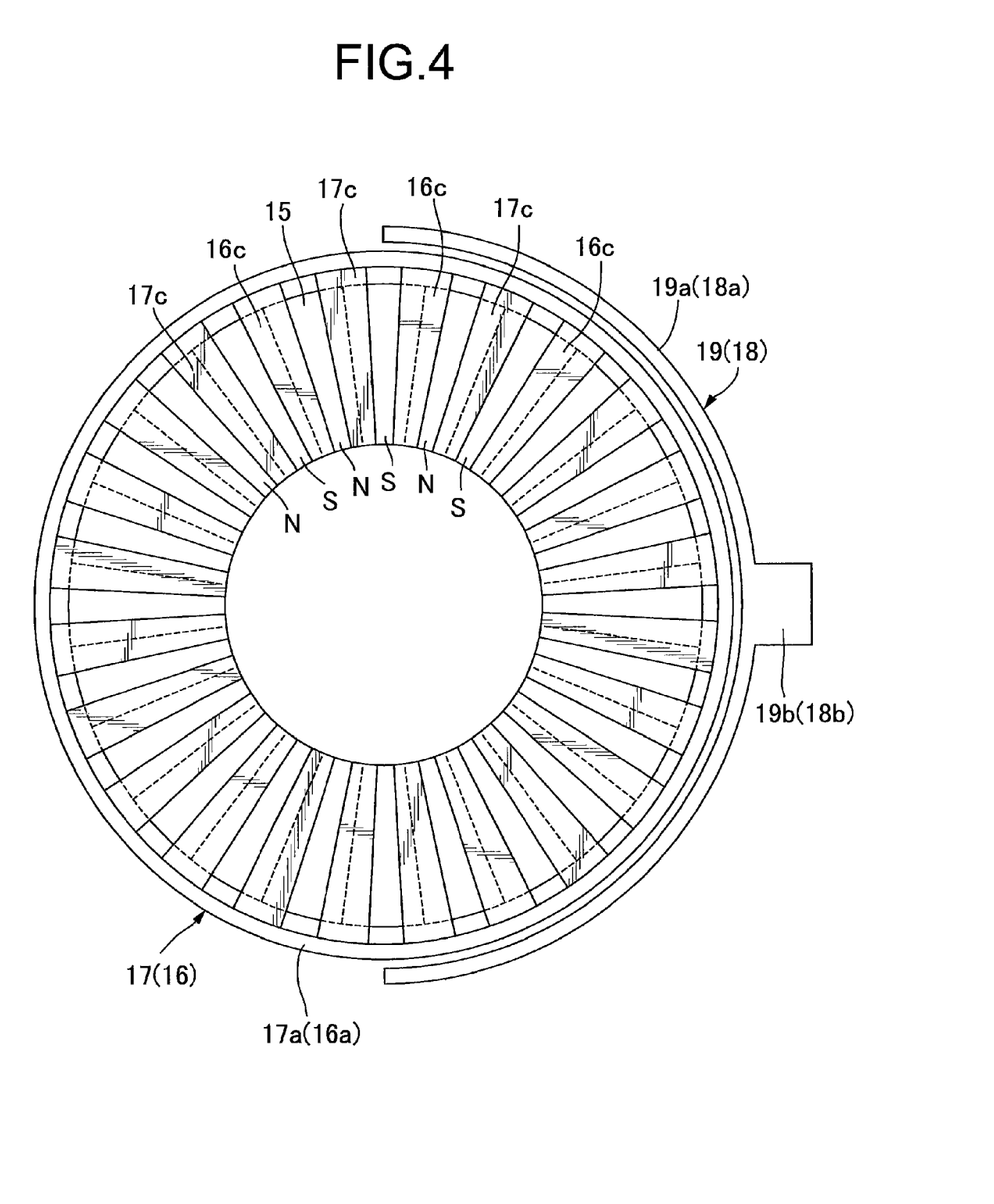
FIG. 4 is a view in which relative positions of the rotating yokes, magnetism-collecting yokes, and permanent magnet in a neutral state are seen from arrow directions of a line 4-4 in FIG. 1.

In a neutral state in which there is no twisting between the first shaft 11 and the second shaft 12, when viewed in the axial direction of the first and second shafts 11 and 12, as shown in FIG. 4, a central part in the peripheral direction of the claw portions 16c of the first rotating yoke 16 and a central part in the peripheral direction of the claw portions 17c of the second rotating yoke 17 are at positions corresponding to borders between N poles and S poles at one end face of the permanent magnet 15.

Figure 5:
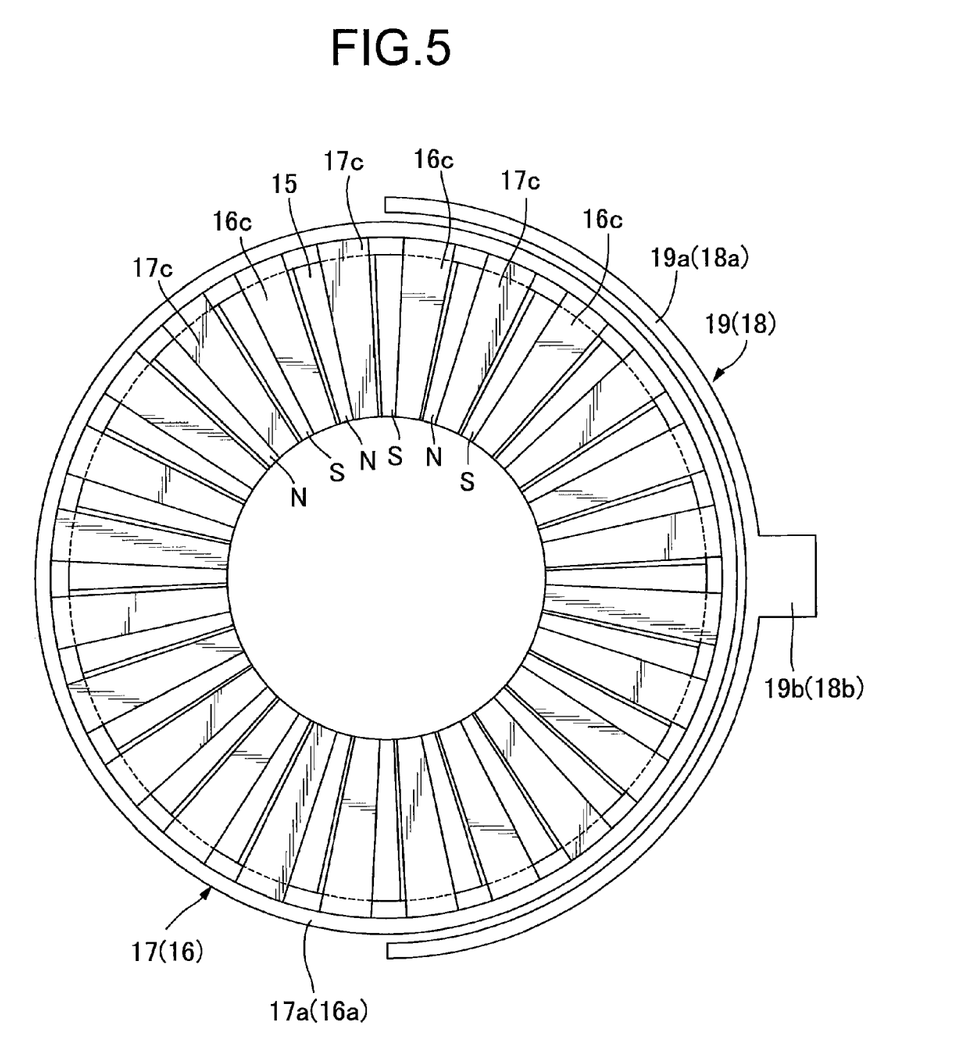
FIG. 5 is a view corresponding to FIG. 4 in a state in which a first shaft rotates relative to the second shaft from the neutral state to one direction.

When the first shaft 11 pivots in one direction (clockwise direction in FIG. 4) from the neutral state, as shown in FIG. 5, the claw portions 16c of the first rotating yoke 16 overlap in the axial direction the S poles at said one end face of the permanent magnet 15, and the claw portions 17c of the second rotating yoke 17 overlap in the axial direction the N poles at said one end face of the permanent magnet 15. In this state, magnetic flux flows from the N poles of the permanent magnet 15, via the second rotating yoke 17, the magnetism-collecting portion 19b of the second magnetism-collecting yoke 19, the magnetism detection element 20, the magnetism-collecting portion 18b of the first magnetism-collecting yoke 18, and the first rotating yoke 16, to the S poles of the permanent magnet 15, and the magnetic flux density increases as the amount of overlap in the axial direction between the claw portions 16c of the first rotating yoke 16 and the S poles at said one end face of the permanent magnet 15 and the amount of overlap in the axial direction between the claw portions 17c of the second rotating yoke 17 and the N poles at said one end face of the permanent magnet 15, that is, the amount of twisting in said one direction of the first shaft 11 relative to the second shaft 12, increases.

Figure 6:
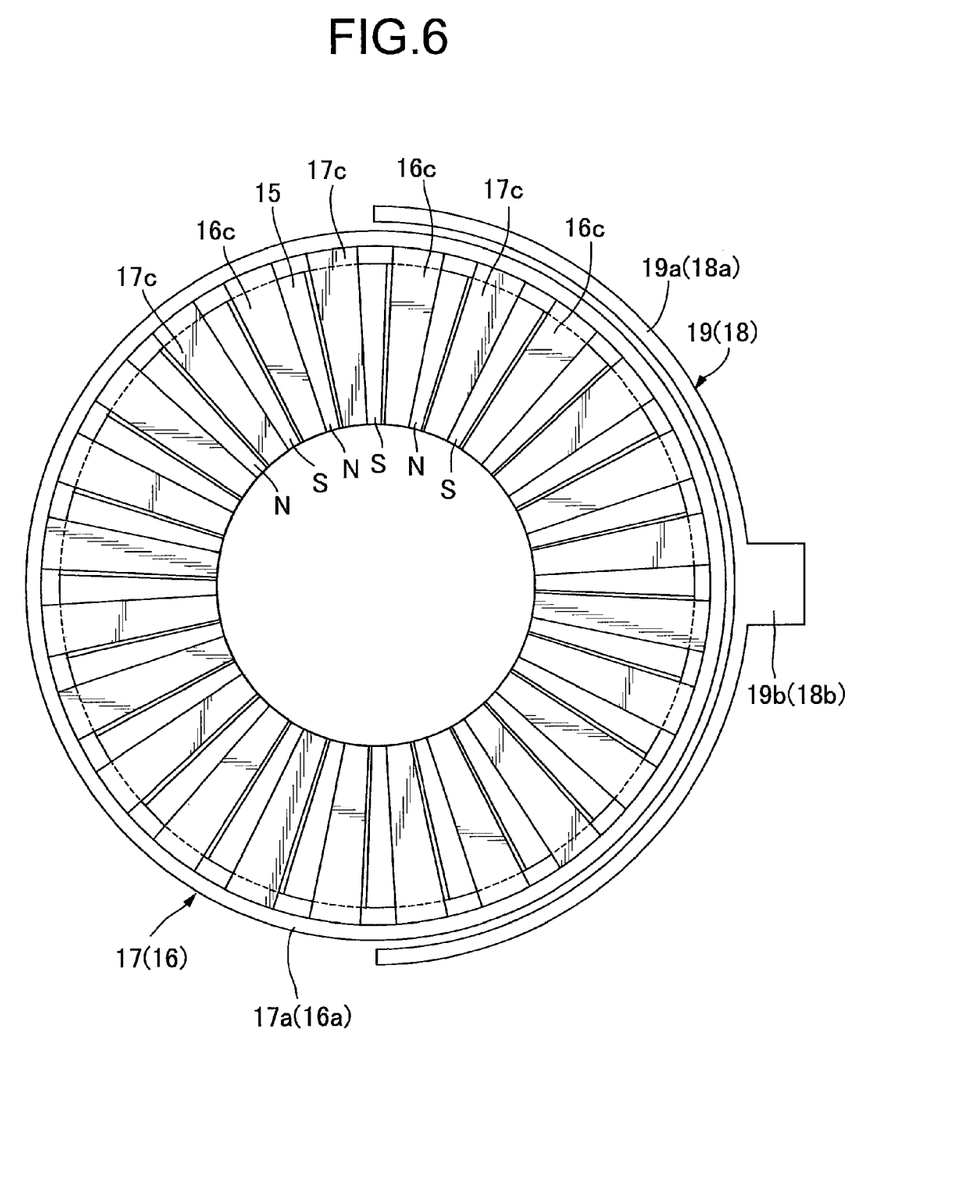
FIG. 6 is a view corresponding to FIG. 4 in a state in which the first shaft rotates relative to the second shaft from the neutral state to the other direction.

Furthermore, when the first shaft 11 pivots in the other direction (anticlockwise direction in FIG. 4) from the neutral state, as shown in FIG. 6, the claw portions 16c of the first rotating yoke 16 overlap in the axial direction the N poles at said one end face of the permanent magnet 15, and the claw portions 17c of the second rotating yoke 17 overlap in the axial direction the S poles at said one end face of the permanent magnet 15. In this state, magnetic flux flows from the N poles of the permanent magnet 15, via the first rotating yoke 16, the magnetism-collecting portion 18b of the first magnetism-collecting yoke 18, the magnetism detection element 20, the magnetism-collecting portion 19b of the second magnetism-collecting yoke 19, and the second rotating yoke 17, to the S poles of the permanent magnet 15, and the magnetic flux density increases as the amount of overlap in the axial direction between the claw portions 16c of the first rotating yoke 16 and the N poles at said one end face of the permanent magnet 15 and the amount of overlap in the axial direction between the claw portions 17c of the second rotating yoke 17 and the S poles at said one end face of the permanent magnet 15, that is, the amount of twisting in said other direction of the first shaft 11 relative to the second shaft 12, increases.

Figure 7:
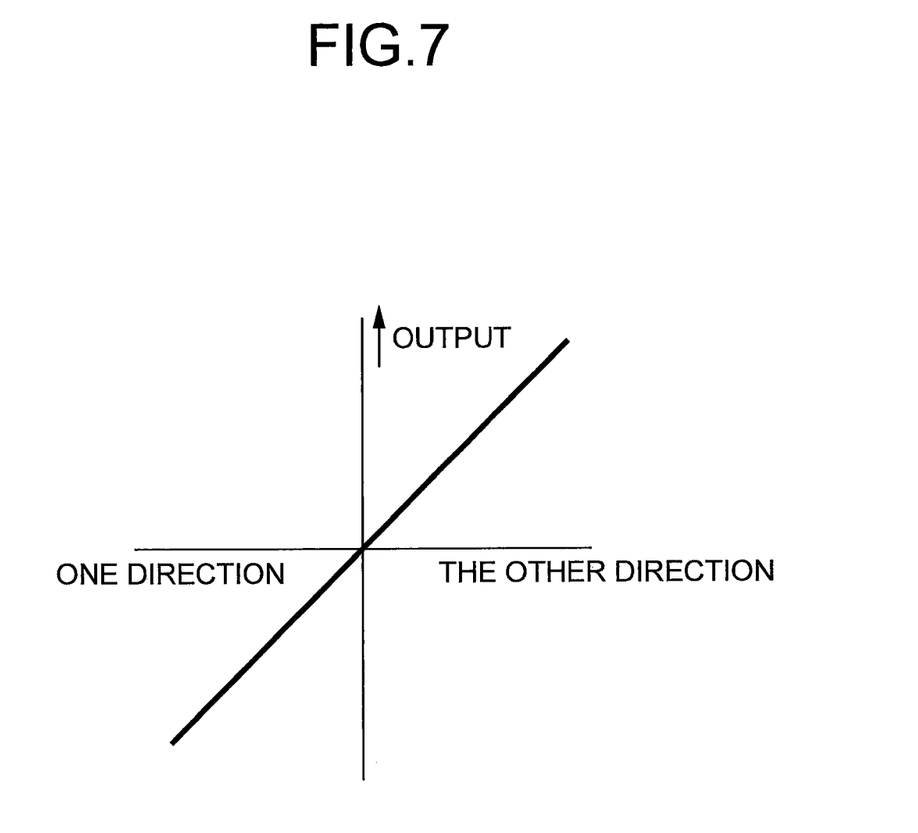
FIG. 7 is a view showing an output change of a magnetism detection element.

In accordance with such a change in the relative position in the peripheral direction of the permanent magnet 15 relative to the first and second rotating yokes 16 and 17, the output from the magnetism detection element 20 changes, for example, as shown in FIG. 7, and twisting between the first and second shafts 11 and 12 is detected based on changes in output from the magnetism detection element 20.

The operation of Embodiment 1 is now explained. The multi-pole permanent magnet 15 is fixed to one, that is, the first shaft 11, of the first shaft 11 and the second shaft 12, which are linked via the torsion bar 13, the first and second rotating yokes 16 and 17 are fixed to the other of the first shaft 11 and the second shaft 12, that is, the second shaft 12, the first and second rotating yokes 16 and 17 being provided at equal intervals in the peripheral direction with the pluralities of claw portions 16c; 17c facing the permanent magnet 15, and the magnetism detection element 20 is disposed between the magnetism-collecting portions 18b and 19b of the first and second magnetism-collecting yokes 18 and 19 individually facing the first and second rotating yokes 16 and 17. Since the first and second rotating yokes 16 and 17 are formed into identical shapes, and the first and second rotating yokes 16 and 17 are disposed so as to be spaced in the axial direction of the first shaft 11 and the second shaft 12 so that the claw portions 16c; 17c provided respectively on the first and second rotating yokes 16 and 17 are alternatingly disposed within the same plane perpendicular to the axes of the first shaft 11 and the second shaft 12, it is possible to form the first and second magnetism-collecting yokes 18 and 19, which individually face the rotating yokes 16 and 17, into identical shapes, thus lessening the number of parts and reducing the cost.

Embodiment 2

Figure 8:
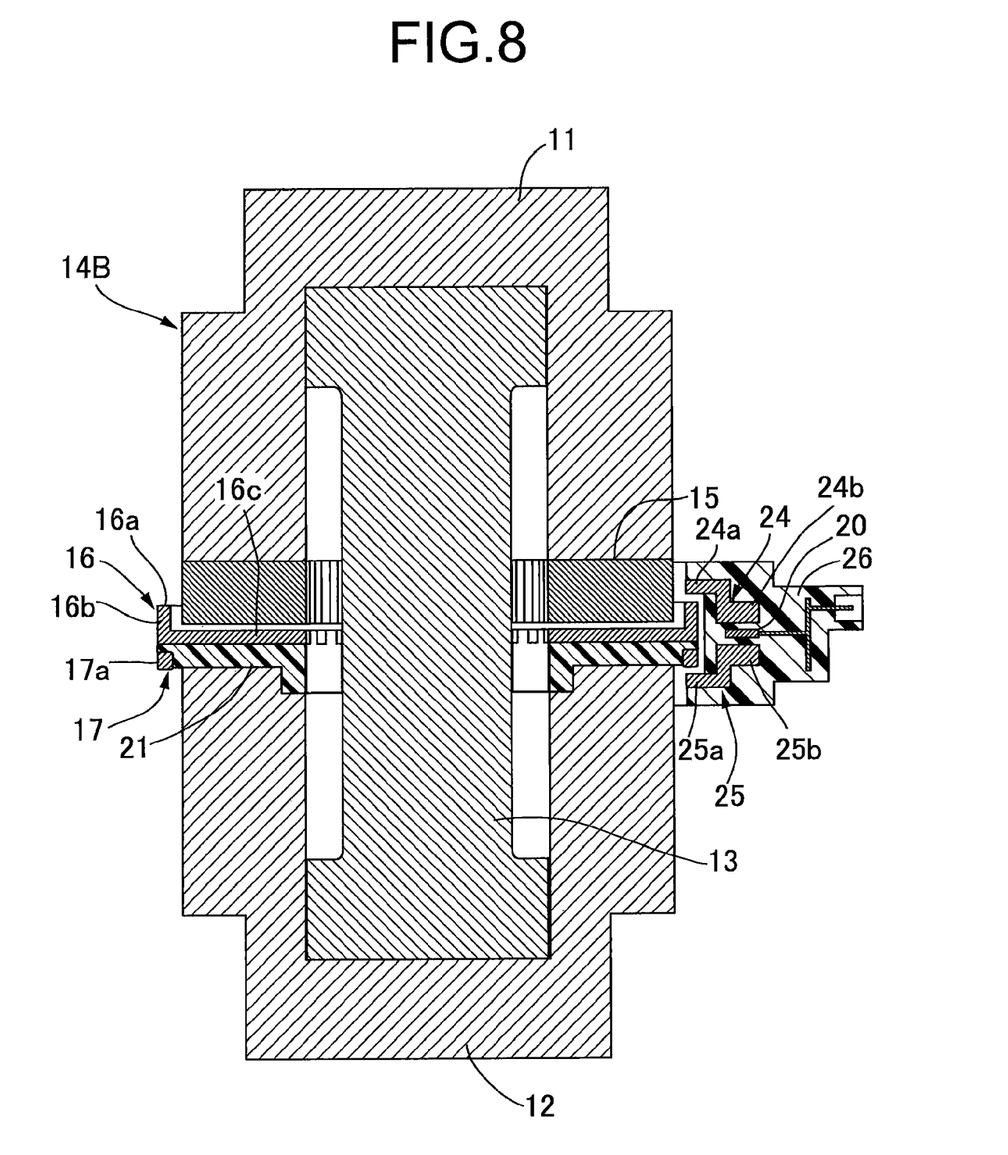
FIG. 8 is a longitudinal cross-sectional view of a torque sensor according to Embodiment 2.
Figure 9:
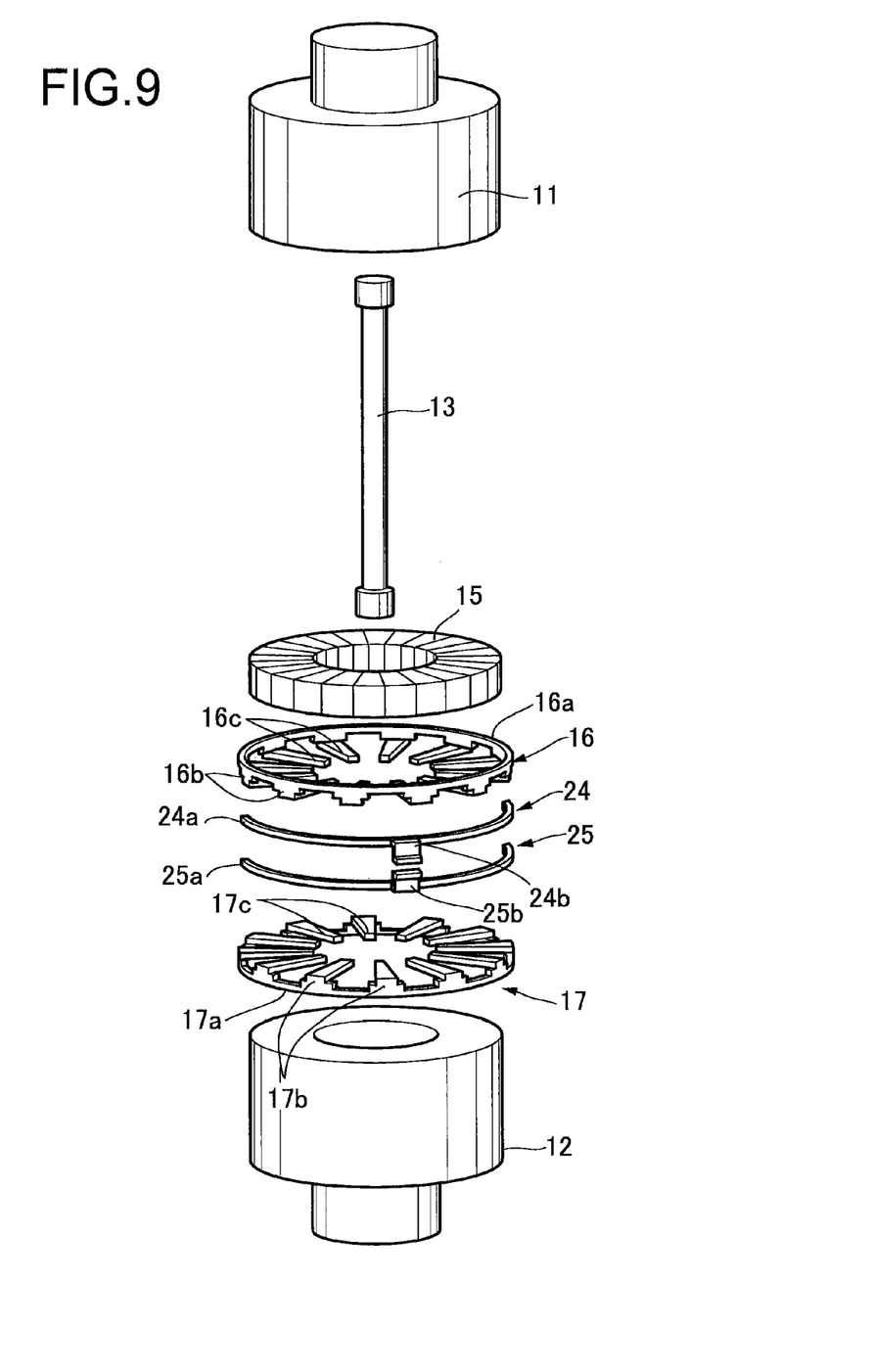
FIG. 9 is an exploded perspective view of the torque sensor with a holder being omitted.
Figure 10:
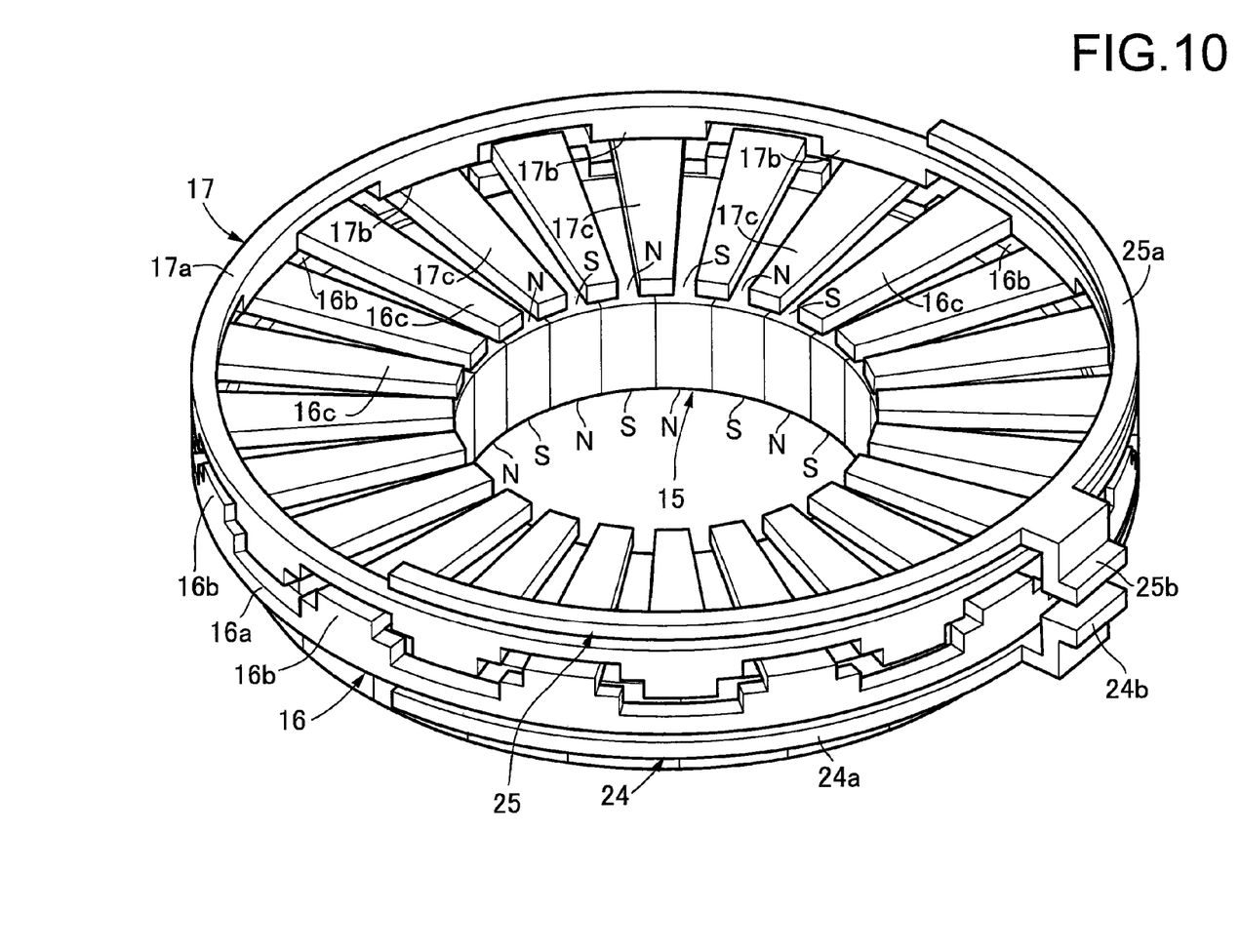
FIG. 10 is a perspective view showing rotating yokes, magnetism-collecting yokes, and a permanent magnet seen from a second shaft side.

Embodiment 2 of the present invention is explained by reference to FIG. 8 to FIG. 10; parts corresponding to those of Embodiment 1 above are shown using the same reference numerals and symbols, a detailed explanation being omitted.

A torque sensor 14B includes a ring-shaped permanent magnet 15 fixed to one of coaxial first and second shafts 11 and 12, that is, the first shaft 11, first and second rotating yokes 16 and 17 fixed to the other of the first shaft 11 and the second shaft 12, that is, the second shaft 12, first and second magnetism-collecting yokes 24 and 25 individually facing the first and second rotating yokes 16 and 17 from a direction along the axial direction of the first shaft 11 and the second shaft 12, and a magnetism detection element 20 disposed between the first and second magnetism-collecting yokes 24 and 25.

The first and second magnetism-collecting yokes 24 and 25 are formed into identical shapes integrally having arc portions 24a and 25a formed into an arc shape with the axis of the second shaft 12 as the center and magnetism-collecting portions 24b and 25b projecting outward in the radial direction from central parts in the peripheral direction of the arc portions 24a and 25a, and are mold bonded to a semicircular fixed holder 26 at positions spaced in the axial direction of the first shaft 11 and the second shaft 12 so that the arc portion 24a faces an end part, on the first shaft 11 side, of the first rotating yoke 16 and the arc portion 25a faces an end part, on the second shaft 12 side, of the second rotating yoke 17. The magnetism detection element 20 disposed between the magnetism-collecting portions 24b and 25b is embedded in the fixed holder 26.

In accordance with Embodiment 2, in addition to the same effects as those of Embodiment 1 above being exhibited, since the first and second magnetism-collecting yokes 24 and 25 are disposed so as to individually face the first and second rotating yokes 16 and 17 from the direction along the axial direction of the first shaft 11 and the second shaft 12, it is possible to reduce the dimension of the torque sensor 14B in its radial direction.

Embodiments of the present invention are explained above, but the present invention is not limited to the above-mentioned embodiments and may be modified in a variety of ways as long as the modifications do not depart from the gist of the present invention.

What is claimed is:

1. A torque sensor in which a multi-pole permanent magnet is fixed to one of a first shaft and a second shaft linked via a torsion bar, a first rotating yoke and a second rotating yoke each having provided at equal intervals in a peripheral direction a plurality of claw portions facing the permanent magnet are fixed to the other of the first shaft and the second shaft, and a magnetism detection element is disposed between a first magnetism-collecting yoke and a second magnetism-collecting yoke, wherein the first and second rotating yokes are formed into an identical shape and an identical size, and the claw portions provided respectively on the rotating yokes are alternatingly disposed in a peripheral direction within a plane extending perpendicular relative to longitudinal axes of the first shaft and the second shaft, and the first and second magnetism-collecting yokes are mold bonded to a semicircular fixed holder at positions spaced in a longitudinal axial direction of the first and second shafts, such that the first and second magnetism-collecting yokes respectively face the first and second rotating yokes for reducing a dimension of the torque sensor in a radial direction.

2. The torque sensor of claim 1, wherein the magnetism detection element disposed between the first magnetism-collecting yoke and the second magnetism-collecting yoke is embedded in the semicircular fixed holder.

\* \* \* \* \*